United States Patent [19]

Pausch et al.

[11] Patent Number: 4,556,173
[45] Date of Patent: Dec. 3, 1985

[54] BIN FLUIDIZER

[75] Inventors: Josef Pausch, Minnetonka; David A. Sorenson, Hopkins, both of Minn.

[73] Assignee: General Resource Corp., Hopkins, Minn.

[21] Appl. No.: 542,643

[22] Filed: Oct. 17, 1983

[51] Int. Cl.[4] .................................................. B05B 1/30
[52] U.S. Cl. ................................ 239/533.13; 137/860; 222/195; 406/137
[58] Field of Search ................................ 239/451–453, 239/533.13, 533.14, 602; 134/167 R; 137/852, 860; 222/195; 366/106, 107; 406/137

[56] References Cited

U.S. PATENT DOCUMENTS

| 2,890,838 | 6/1959 | Jannsen | 239/533.13 |
| 2,901,184 | 8/1959 | Kane | 239/533.14 X |
| 3,298,394 | 1/1967 | Chorkey | 137/860 |
| 3,754,740 | 8/1973 | Piper | 239/533.13 X |
| 3,929,261 | 12/1975 | Solimar | 406/137 X |
| 3,952,956 | 4/1976 | Steele | 239/533.13 X |
| 4,059,311 | 11/1977 | Spitzer et al. | 406/137 X |
| 4,172,539 | 10/1979 | Botkin | 406/137 X |
| 4,449,644 | 5/1984 | Matson | 406/137 X |

FOREIGN PATENT DOCUMENTS 1205405 11/1965 Fed. Rep. of Germany ...................... 239/533.13

*Primary Examiner*—Johnny D. Cherry
*Attorney, Agent, or Firm*—Paul L. Sjoquist

[57] ABSTRACT

Apparatus for attachment to the side wall of a hopper or bin, having connections to an extenal source of pressurized air, and having an annular orifice internal to the hopper or bin, wherein the annular orifice is covered by a resilient ring, thereby pemitting the flow of pressurized air outwardly through the annular orifice while protecting the annular orifice from contamination and plugging by materials stored in the bin or hopper.

4 Claims, 3 Drawing Figures

BIN FLUIDIZER

BACKGROUND OF THE INVENTION

The present invention relates generally to hoppers and storage bins for retaining particulate matter, and more specifically to a fluidizer for connection to such bins for dislodging compacted material within the storage receptacle.

The storage of particulate matter in various types of containers presents a problem whenever such materials are to be removed from the storage container. Particulate matter tends to compact in whatever type of storage container it is held, the compacted material sometimes forming a hardened mass which resists removal from the container. For example in a typical hopper storage container the material is removed via an opening from the bottom of the hopper, wherein a gate is opened and the material in the hopper is permitted to fall free under the influence of gravity. Compaction of this material presents a continuing problem, for in some instances the material bridges across the inside of the hopper to prevent removal of the material. In other cases, the material adheres to the sides of the hopper in compacted volumes, which volumes are difficult to dislodge from the inside of the hopper. The problem is compounded by the construction of typical hoppers, wherein the bottom of the hopper is typically formed into a narrowed and tapered wall with a lower opening for removal of the material. Compaction occurs most frequently along the sloping inner walls of the hopper, and bridging of compacted material frequently occurs in the region between the sloping hopper walls.

SUMMARY OF THE INVENTION

The present invention relates to an apparatus for attachment to the wall of a storage container such as a hopper, wherein a small air jet annular orifice projects a short distance into the hopper interior, the annular orifice having a resilient protective ring sealably surrounding the orifice, and an external air passage and valve adapted for coupling to a source of pressurized air.

It is a principal object of the present invention to provide an air jet fluidizer inside of a storage container, which fluidizer emits a rotary pulse jet of air to dislodge particulate matter and thereby fluidize such matter, the fluidizer having a resilient sealing ring to protect the rotary pulse jet from clogging by the particulate matter in the storage container.

It is a further object of the present invention to provide an air jet fluidizer with minimum projecting silhouette into a storage container.

It is another object of the present invention to provide an air jet fluidizer which may be adapted for attachment to a storage container in a plurality of locations.

BRIEF DESCRIPTION OF THE DRAWINGS

The foregoing and other advantages will become apparant from the following specification and claims, and with reference to the appended drawings, in which:

DESCRIPTION OF THE PREFERRED EMBODIMENT

Figure 1:
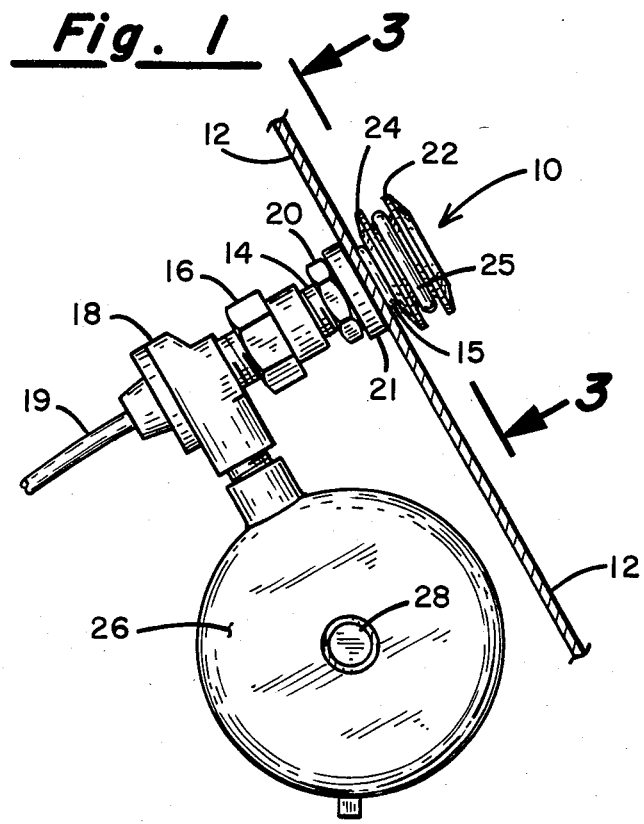
FIG. 1 shows an elevation view of the invention attached to a storage container.

Referring first to FIG. 1, there is shown a fluidizer 10 attached to the wall 12 of a hopper or other type storage container. Fluidizer 10 has an internal flange 24 which is sealably attached against wall 12, and an external flange 22. A resilient ring 25 is held between flanges 24 and 22 in a manner to be described in more detail hereinafter. Fluidizer 10 has a threaded shank 14, and a lock nut 20 which is threadably tightened on shank 14 to tightly clamp washer 21 against wall 12. A threaded coupler 16 is also attached to shank 14, and is attached to a valve 18, preferably of a diaphragm valve construction. Valve 18 is attached in flow coupling relationship to an air tank 26, which air tank holds a supply of compressed air. Air tank 26 has an air inlet 28 for receiving compressed air from an external source. Valve 18 has a control line 19 which serves to actuate valve 18 in a manner to permit pressurized air from tank 26 to be emitted into and through fluidizer 10. One preferred construction of valve 18 is Model 25TRCA, manufactured by Goyen Controls of America, Ltd., Ocean City, N.J.

Figure 2:
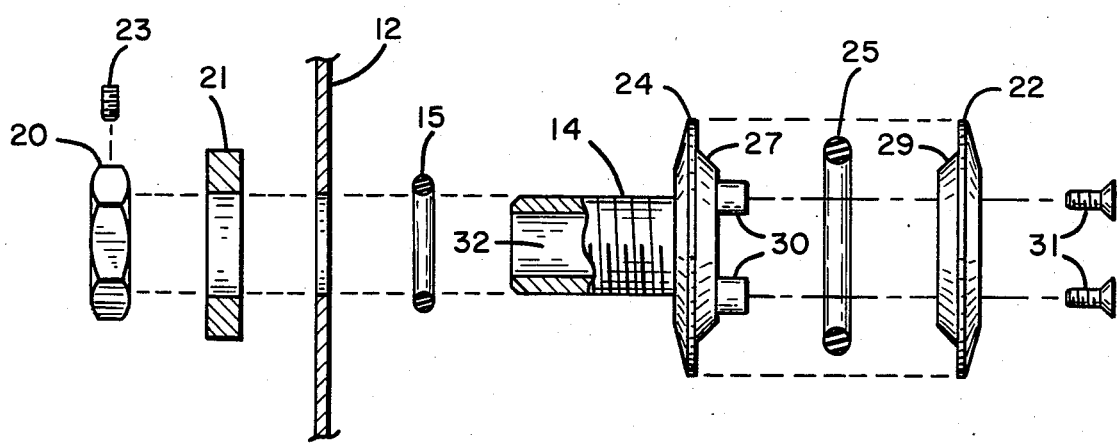
FIG. 2 shows an exploded view of the invention.

FIG. 2 shows an exploded view of fluidizer 10, and illustrates the relationships of the components of fluidizer 10 with respect to wall 12. Internal flange 24 forms an integral part and extension of threaded shank 14. Internal flange 24 has projecting therefrom several shoulders 30 which serve as spacers for the fitting of resilient ring 25. One or more screws 31 are fitted through external flange 22 and are threadably tightened into shoulders 30 so as to rigidly position external flange 22 at a spaced apart distance from internal flange 24, with the resilient ring held therebetween. A sealing ring 15 is clamped between the internal surface of internal flange 24 and wall 12. Sealing ring 15 serves to provide a tight seal between wall 12 and fluidizer 10. On the outside of wall 12 there is fitted a washer 21 over threaded shank 14, and a lock nut 20 is threaded on shank 14 to tighten the entire assembly and clamp it against wall 12. There may be provided a further lock screw 23 which is threadably tightened into lock nut 20 to bear against threaded shank 14 and thereby prevent any loosening of lock nut 20.

The height of shoulders 30 is carefully selected with respect to resilient ring 25 so as to loosely clamp resilient ring 25 between flanges 22 and 24. Internal flange 24 has a tapered surface 27 which acts to seat against one side of resilient ring 25. Likewise, external flange 22 has a tapered surface 29 for seating against resilient ring 25. When flanges 22 and 24 are tightened together there is provided an annular seating of resilient ring 25 about the tapered surfaces 27 and 29, but such seating is just sufficient to hold resilient ring 25 in a fixed position relative to flanges 22 and 24.

Figure 3:
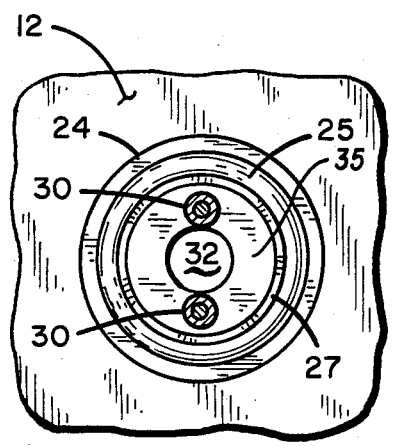
FIG. 3 shows a view of the invention taken along the lines 3—3 of FIG. 1.

Threaded shank 14 and internal flange 24 have a hole 32 drilled therethrough. Hole 32 permits the passage of air through the threaded shank and flange 24 into the interior region surrounded by resilient ring 25. FIG. 3 shows a cross-sectional view taken along the lines 3—3 of FIG. 1. Chamber 35 is formed inside of resilient ring 25, and chamber 35 is in flow communication with hole 32 through shank 14 and internal flange 24. Resilient ring 25 provides the outer walls of chamber 35.

In operation, valve 18 is actuated by means of control line 19 to permit the volume of pressurized air in tank 26 to pass into the hole 32 of threaded shank 14. This pressurized air passes through threaded shank 14 and internal flange 24 into chamber 35. Pressurized air causes resilient ring 25 to suddenly expand and thereby permit the flow of pressurized air past resilient ring 25 in the region between ring 25 and tapered surfaces 27 and 29. This pressurized air is suddenly released into the storage container or hopper, in a more or less circular pattern, and a blast of air serves to loosen any compacted particulate matter which may be lodged against wall 12. It has been found that the sudden expansion of resilient ring 25 causes unbalanced elastic forces along the circumference of ring 25, and this unbalance of forces causes ring 25 to rotate in a more or less random manner about the annular orifice created between flanges 22 and 24. Therefore, each time a jet of air is passed through the fluidizer, ring 25 briefly expands to permit the escape of this air jet, and at the same time ring 25 undergoes a small rotational moment before returning to its seat against tapered surfaces 27 and 29. This rotational moment causes ring 25 to become seated against surfaces 27 and 29 in a relatively different circumferential position each time it is actuated. This intermittent motion causes resilient ring 25 to wear more or less evenly about its seat, and therefore contributes to a longer useful life of resilient ring 25. When resilient ring 25 is properly seated, there is provided a seal about the annular orifice between flanges 22 and 24, and therefore particulate matter from inside of the hopper or container is prevented from entering the air passages described herein.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus attachable to a wall surface for directing a pressure wave of air radiating outwardly in all directions normal to a central passage, comprising
   (a) a threaded member having a length sufficient to pass through a wall surface, said threaded member having a central passage therethrough;
   (b) a raised flange on one end of said threaded member, said flange comprising a circular shoulder concentrically positioned about said central passage; a truncated conical section having a maximum diameter less than the diameter of said circular shoulder, projecting concentrically from said shoulder and terminating in a reduced diameter flat surface; at least two spacers projecting from said flat surface, and said central passage opening through said flat surface between said spacers;
   (c) an end cap comprising a circular shoulder of substantially the same diameter as said flange shoulder; a truncated conical section having a maximum diameter less than the diameter of said shoulder, projecting concentrically from said shoulder and terminating in a flat surface; and holes through said end cap alignable with said at least two spacers;
   (d) means for removably fastening said end cap to said flange with said respective flat surfaces of said truncated conical sections in facing and spaced apart relationship, thereby forming an annular gap in the space between said conical sections, said gap being in air flow communication with said central passage; and
   (e) a resilient O-ring seated against said respective truncated conical sections, said O-ring being sized for compressible fit about said conical sections to cover said facing portions and the spaced apart gap formed therebetween.

2. The apparatus of claim 1, further comprising a pressure valve attached to said threaded member.

3. The apparatus of claim 2, further comprising a source of pressurized air attached to said pressure valve.

4. The apparatus of claim 3, further comprising means for actuating said pressure valve for brief periods of time.

* * * * *